(12) United States Patent
Hoshide et al.

(10) Patent No.: US 10,968,956 B2
(45) Date of Patent: Apr. 6, 2021

(54) METHOD FOR DIAGNOSING STATE OF ROLLING GUIDE DEVICE

(71) Applicant: THK CO., LTD., Tokyo (JP)

(72) Inventors: Kaoru Hoshide, Tokyo (JP); Toshiro Tojo, Tokyo (JP); Yoshiyuki Honjo, Tokyo (JP); Ryuji Furusawa, Tokyo (JP); Ayako Miyajima, Tokyo (JP)

(73) Assignee: THK CO., LTD., Tokyo (JP)

( * ) Notice: Subject to any disclaimer, the term of this patent is extended or adjusted under 35 U.S.C. 154(b) by 290 days.

(21) Appl. No.: 16/086,370

(22) PCT Filed: Mar. 8, 2017

(86) PCT No.: PCT/JP2017/009209
§ 371 (c)(1),
(2) Date: Sep. 19, 2018

(87) PCT Pub. No.: WO2017/163875
PCT Pub. Date: Sep. 28, 2017

(65) Prior Publication Data
US 2019/0128330 A1 May 2, 2019

(30) Foreign Application Priority Data

Mar. 25, 2016 (JP) .............................. JP2016-061570
Jul. 28, 2016 (JP) .............................. JP2016-148713

(51) Int. Cl.
*G06F 11/30* (2006.01)
*F16C 41/00* (2006.01)
(Continued)

(52) U.S. Cl.
CPC .............. *F16C 41/00* (2013.01); *F16C 29/06* (2013.01); *F16C 33/66* (2013.01); *F16N 29/04* (2013.01);
(Continued)

(58) Field of Classification Search
CPC ...................................................... F16C 41/00
See application file for complete search history.

(56) References Cited

U.S. PATENT DOCUMENTS 7,096,595 B2 8/2006 Greubel
2014/0260729 A1 9/2014 Jiang et al.

FOREIGN PATENT DOCUMENTS

JP 2003-11038 A 1/2003
JP 2004-61117 A 2/2004
(Continued)

OTHER PUBLICATIONS

International Search Report dated Jun. 6, 2017, issued in counterpart International Application No. PCT/JP2017/009209 (2 pages).

*Primary Examiner* — Phuong Huynh
(74) *Attorney, Agent, or Firm* — Westerman, Hattori, Daniels & Adrian, LLP (57) ABSTRACT

Provided is a diagnosis method of appropriately recognizing a state of a rolling surface of a track member of a rolling guide device or a lubrication state of rolling elements using a sensor mounted to the rolling guide device. The diagnosis method is applied to a rolling guide device including: a track member having a rolling surface extending along a longitudinal direction of the track member; and a moving member, which is assembled to the track member through intermediation of a plurality of rolling elements configured to roll on the rolling surface so that the moving member is movable along the track member, and has an endless circulation path for the rolling elements. The diagnosis method includes: detecting a moving speed of the moving member relative to the track member while detecting relative vibration displacement of the moving member relative to the track member using a vibration sensor mounted to the moving member;

(Continued)

and diagnosing a running state of the moving member relative to the track member based on those detection results.

7 Claims, 6 Drawing Sheets

(51) Int. Cl.
  *F16C 29/06* (2006.01)
  *F16C 33/66* (2006.01)
  *F16N 29/04* (2006.01)

(52) U.S. Cl.
  CPC ...... *F16C 29/0647* (2013.01); *F16C 2233/00* (2013.01); *F16C 2322/39* (2013.01)

(56) References Cited

FOREIGN PATENT DOCUMENTS

| | | | |
|---|---|---|---|
| JP | 2004-347401 A | | 12/2004 |
| JP | 2005-121215 A | | 5/2005 |
| JP | 200311038 | * | 5/2005 |
| JP | 2013-50193 A | | 3/2013 |
| JP | 201350193 | * | 3/2013 |
| JP | 2014114944 | * | 1/2014 |
| JP | 2014-114944 A | | 6/2014 |

* cited by examiner

METHOD FOR DIAGNOSING STATE OF ROLLING GUIDE DEVICE

TECHNICAL FIELD

The present invention relates to a method, which is applied to a rolling guide device to be used in a linear guide portion or a curved guide portion of industrial machines such as machine tools or various conveying devices, and diagnoses whether or not the rolling guide device is in a state of being capable of executing its original performance.

BACKGROUND ART

Hitherto, a rolling guide device of this type includes a track member and a moving member. The track member has a rolling surface for rolling elements, which extends along a longitudinal direction of the track member. The moving member is assembled to the track member through intermediation of a plurality of rolling elements which roll on the rolling surface, and is reciprocable along the track member. The moving member has a load rolling surface on which the rolling elements roll while bearing a load. The load rolling surface is opposed to the rolling surface of the track member to define a load path for the rolling elements. Further, the moving member has no-load paths for allowing the rolling elements to circulate from one end to another end of the load path. The load path and the no-load paths are continuous with one another to define an endless circulation path for the rolling elements. With such a configuration, the moving member is movable along the track member without being limited in stroke thereof.

A product lifetime of the rolling guide device mainly depends on fatigue in the rolling surface of the track member or the load rolling surface of the moving member. However, when the rolling surface and the load rolling surface as well as the rolling elements such as balls or rollers which roll thereon are not appropriately lubricated with lubricant, flaking of the rolling surface or the load rolling surface may occur early, with the result that the product lifetime of the rolling guide device is shortened. Further, rolling resistance of the rolling elements may increase, with the result that there is a fear in that, for example, acceleration of a table in motion, which is movably supported by the rolling guide device, is degraded, that is, the rolling guide device cannot exert its original performance.

Meanwhile, the rolling guide device is applicable to various uses, and a lubrication state of the rolling surface or other part is inevitably affected by, for example, a use environment and an applied load depending on the use (hereinafter referred to as "use condition"). Thus, in order to allow the rolling guide device to exert its original performance and fulfill its product lifetime, it is desired that an operation condition of the rolling guide device be continuously detected by various sensors, to thereby allow recognition of the state of the rolling guide device, which is varied from hour to hour, based on the detected contents. Further, it is desired that supply of the lubricant be controlled based on the recognized state, and that an operation of an industrial machine having the rolling guide device incorporated therein may be controlled as needed.

In Patent Literature 1, there is disclosed an example in which a sensor configured to detect presence of lubricant on the track member is mounted to the moving member. However, the sensor is mounted on an outer side of the moving member. Thus, even though the fact of whether or not the lubricant adheres to the track member can be checked, a lubrication state and a circulation state of the rolling elements in the endless circulation path of the moving member cannot be directly recognized.

CITATION LIST

Patent Literature

[PTL 1] JP 2005-121215 A

DISCLOSURE OF THE INVENTION

Problems to be Solved by the Invention

The present invention has been made in view of the above-mentioned problem, and has an object to provide a diagnosis method of appropriately recognizing a state of a rolling surface of a track member of a rolling guide device or a lubrication state of rolling elements using a sensor mounted to the rolling guide device.

Means for Solving the Problems

When the track member and the moving member are relatively moved, even in a case in which the track member and the moving member have no problem, extremely small vibration is caused. In addition, the vibration depends on a moving speed of the moving member relative to the track member. Further, when lubrication of the rolling surface of the track member or the rolling elements is defective, or flaking occurs in the rolling surface, the vibration tends to be larger. The present invention has been made based on those findings. That is, according to one embodiment of the present invention, there is provided a state diagnosis method for a rolling guide device. The rolling guide device includes: a track member having a rolling surface extending along a longitudinal direction of the track member; and a moving member, which is assembled to the track member through intermediation of a plurality of rolling elements configured to roll on the rolling surface so that the moving member is movable along the track member, and has an endless circulation path for the rolling elements. The state diagnosis method includes: detecting a moving speed of the moving member relative to the track member while detecting relative vibration displacement of the moving member relative to the track member using a vibration sensor mounted to the moving member; and diagnosing a running state of the moving member relative to the track member based on those detection results.

Effects of the Invention

According to one embodiment of the present invention, the relative vibration displacement of the moving member relative to the track member is detected using the sensor mounted to the rolling guide device, and the moving speed of the moving member relative to the track member is detected. Through use of those detection results, whether the running state of the moving member relative to the track member is good or bad, in other words, the state of the rolling surface of the track member or the lubrication state of the rolling elements can be appropriately recognized.

MODE FOR CARRYING OUT THE INVENTION

Now, detailed description is made of a state diagnosis method for a rolling guide device according to one embodiment of the present invention with reference to the accompanying drawings.

Figure 1:
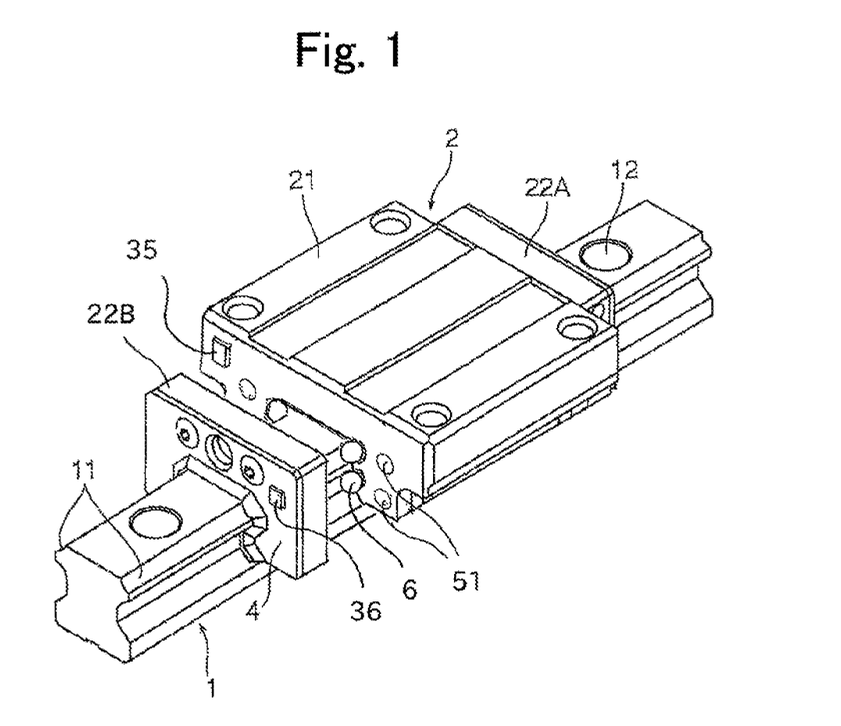
FIG. 1 is a perspective view for illustrating a rolling guide device in a first embodiment to which the present invention is applicable.

FIG. 1 is a perspective view for illustrating a rolling guide device in a first embodiment to which the present invention is applied. The rolling guide device includes a track member 1 and a moving member 2. The track member 1 extends linearly. The moving member 2 is assembled to the track member 1 through intermediation of a plurality of balls being rolling elements. The track member 1 is laid on a fixed portion of various machine tools, and a movable body of a type among various types is mounted to the moving member 2, thereby being capable of guiding the movable body along the track member 1 in a freely reciprocable manner.

The track member 1 is formed into an elongated body having a substantially rectangular cross section. The track member 1 has a plurality of bolt, mounting holes 12, which are formed at predetermined intervals in a longitudinal direction and each penetrate from an upper surface to a bottom surface. With use of fixing bolts inserted into the bolt mounting holes 12, the track member 1 can be rigidly fixed to a fixing portion. On both right and left side surfaces of the track member 1, there are formed two rolling surfaces 11 for the rolling elements. The track member has four rolling surfaces 11 as a whole. The number of rolling surfaces 11 formed on the track member 1 is not limited to four.

Meanwhile, the moving member 2 mainly includes a main body member 21 made of metal, and a pair of covers 22A and 22B made of synthetic resin. The pair of covers 22A and 22B are mounted to both ends of the main body member 21 in a moving direction of the main body member 21. The moving member 2 has a plurality of endless circulation paths for the balls so as to correspond to the rolling surfaces 11 of the track member 1. Further, seal members 4, which are configured to seal gaps between the moving member 2 and the track member 1, are fixed to the covers 22A and 22B, thereby preventing dust or the like adhering to the track member 1 from entering the endless circulation paths. FIG. 1 is an illustration of a disassembled state in which one cover 22B of the pair of covers 22A and 22B mounted to the main body member 21 is removed from the main body member 21.

Figure 2:
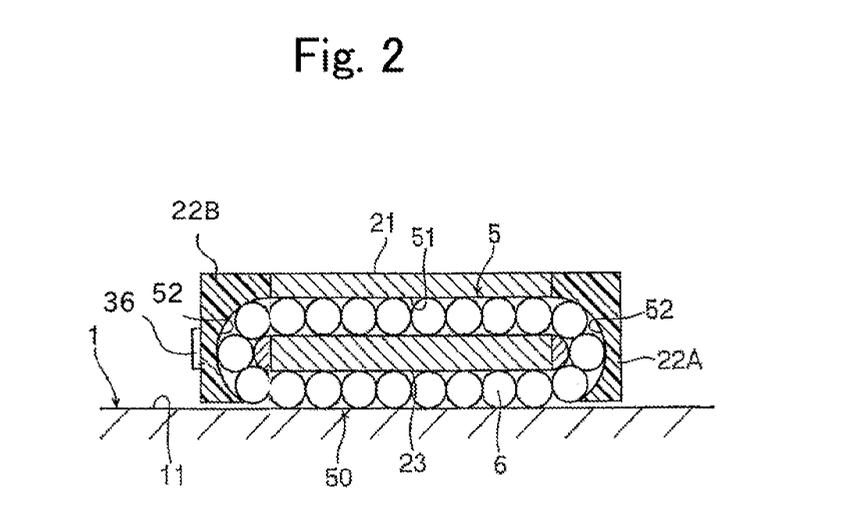
FIG. 2 is a sectional view for illustrating a configuration of an endless circulation path for balls.

FIG. 2 is a sectional view for illustrating the endless circulation path. As illustrated in FIG. 2, the endless circulation path 5 includes a load path 50, a return path 51, and a pair of direction change paths 52. The main body member 21 forming the moving member 2 has a load rolling surface 23 opposed to the rolling surface 11 of the track member 1, and the rolling elements 6 roll while bearing a load between the rolling surface 11 of the track member 1 and the load rolling surface 23 of the main body 21. In the endless circulation path 5, a path portion in which the rolling elements 6 roll while bearing the load corresponds to the load path 50. Further, the main body member 21 has the return path 51 extending parallel to the load path 50. Typically, the return path 51 is formed so as to penetrate through the main body member 21, and an inner diameter of the return path 51 is set so as to be slightly larger than a diameter of the rolling elements 6. With such a configuration, the rolling elements 6 roll in the return path without bearing the load.

The direction change paths 52 are formed in the pair of covers 22A and 22B, respectively. Those covers 22A and 22B are fixed to end surfaces of the main body member 21 so as to sandwich the main body member 21. The direction change path 52 of each of the covers 22A and 22B connects an end portion of the load path 50 and an end portion of the return path 51 to each other, and allows the rolling elements 6 to move therebetween.

Thus, when the pair of covers 22A and 22B are fixed to the main body member 21, the endless circulation path 5 for the rolling elements 6 is brought to completion. In the endless circulation path 5, the rolling elements 6 roll while bearing the load only in the load path 50 defined by the load rolling surface 23 of the main body member 21 and the rolling surface 11 of the track member 1, which are opposed to each other.

In the rolling guide device in the embodiment described with reference to the drawings, the balls are used as the rolling elements 6. However, the present invention is also applicable to a rolling guide device using rollers.

As illustrated in FIG. 1, a vibration sensor 35 is fixed to the end surface of the main body member 21 to which the cover 22B is mounted. An acceleration sensor can be used as the vibration sensor 35, and the vibration sensor 35 is directly bonded to the end surface of the main body member 21.

Meanwhile, a proximity sensor 36 is fixed to an outer side of the cover 22B. The proximity sensor 36 is fixed to the cover at a position of overlapping with the direction change path 52 formed in the cover 22B, and is configured to detect passage of each of the rolling elements 6 in the direction change path 52. The cover 22B is made of synthetic resin, and the rolling elements 6 are each made of metal. Therefore, through use of an induction-type or a capacitance-type proximity sensor, presence of the rolling elements 6 can be detected. In the example illustrated in FIG. 1, the proximity sensor 36 is provided so as to correspond to only one location among four locations of the direction change paths 52, which are formed in the cover 22B. However, a plurality of proximity sensors 36 may be provided so as to correspond to the respective direction change paths 52.

Figure 3:
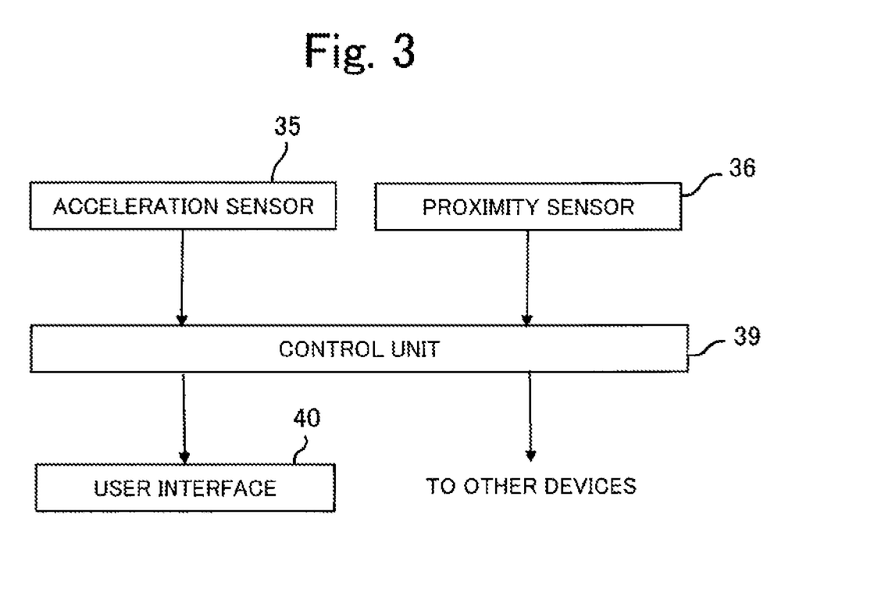
FIG. 3 is a block diagram for illustrating an example of a configuration of a system of carrying out a diagnosis method according to the present invention.

FIG. 3 is a block diagram for illustrating a configuration of a state diagnosis system for the rolling guide device using the vibration sensor 35 and the proximity sensor 36. Detection signals from the vibration sensor 35 and the proximity sensor 36 are input to a control unit 39 through, for example, an A/D converter. The control unit 39 is implemented by a microcontroller including a RAM and a ROM. The control unit 39 executes a diagnosis program stored in advance in the ROM, and outputs a determination signal in accordance with a result of the diagnosis. The determination signal output by the control unit 39 is output to an alarm device or a user interface 40 such as a display.

The vibration sensor 35 is configured to detect an amplitude when the moving member 2 moves along the track member 1, and output the amplitude. It is found that, in the rolling guide device, when a lubrication state of the track member 1 or the rolling elements 6 is deteriorated, of vibration caused in the main body member 21 having the load rolling surface 23, an amplitude of vibration having a high-frequency component of several tens of KHz or more tends to be increased. When an amplitude (displacement) of the vibration having the high-frequency component is to be measured, the sensitivity is higher in a case in which acceleration is measured than in a case in which the amplitude is directly measured. In this respect, an acceleration sensor is suitable as the vibration sensor 35. Further, a bandpass filter configured to damp a low-frequency component may be provided between the vibration sensor and the A/D converter. As described above, based on the output signal from the vibration sensor 35, the amplitude of the vibration of the moving member 2 running on the track member 1, in particular, the amplitude of the high-frequency component is recognized, and the amplitude is compared to a predetermined threshold value. In this manner, whether the lubrication state of the track member 1 or the rolling elements 6 is good or bad can be determined.

Figure 4:
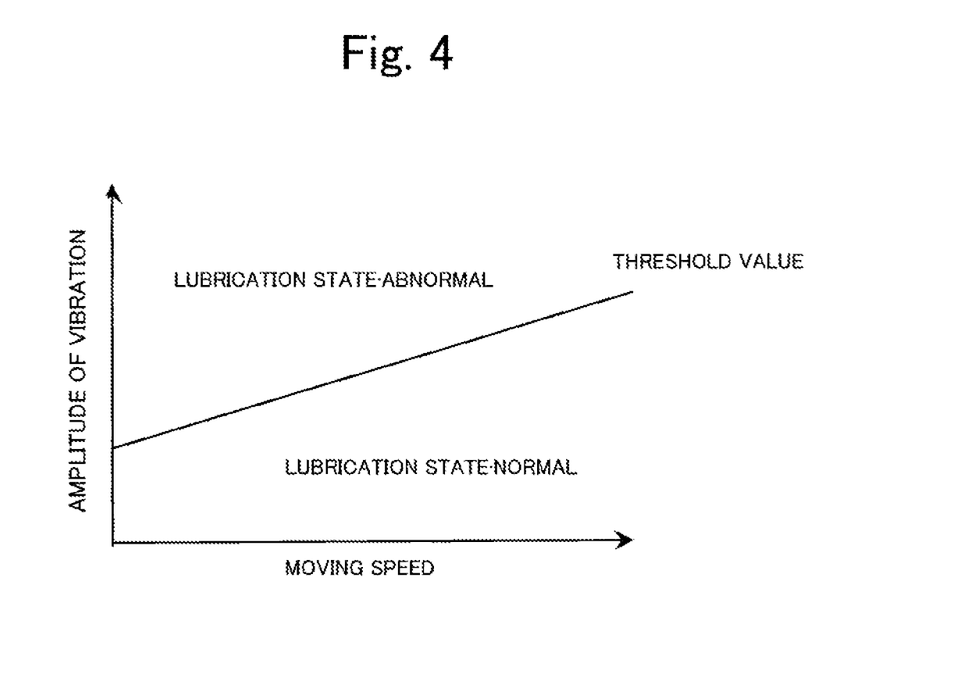
FIG. 4 is a graph for showing a relationship between a moving speed of a moving member and a threshold value for determining whether a lubrication state is good or bad.

Meanwhile, as illustrated in FIG. 4, an experiment reveals that the threshold value for determining whether the lubrication state is normal or abnormal is varied depending on the moving speed of the moving member 2 relative to the track member 1, and, as the moving speed is increased, the threshold value for classifying the lubrication state into the normal or the abnormal tends to be higher. Therefore, in this diagnosis system, the moving speed of the moving member 2 relative to the track member 1 is recognized using the proximity sensor 36. Specifically, the rolling elements 6 passing through the direction change path 52 in the cover 22B are detected using the proximity sensor 36 mounted to the cover 22B so that the number of passages of the rolling elements 6 per unit time is counted. The moving speed of the moving member 2 relative to the track member 1 corresponds to the circulation speed of the rolling elements 6 in the endless circulation path 5. Therefore, the moving speed of the moving member 2 can be recognized only by counting the number of passages of the rolling elements 6 in the direction change path per unit time. With this, based on the moving speed of the moving member 2 relative to the track member 1, the threshold value for classifying the lubrication state into the normal or the abnormal can be determined.

The proximity sensor 36 may be substituted by another sensor as long as the sensor can detect passage of the rolling elements 6 in the direction change path 52. Further, means for recognizing the moving speed of the moving member 2 is not limited to the proximity sensor 36. For example, a linear encoder may be provided in parallel to the track member 1 so that the moving speed of the moving member 2 is recognized based on a detection signal from the linear encoder.

Figure 5:
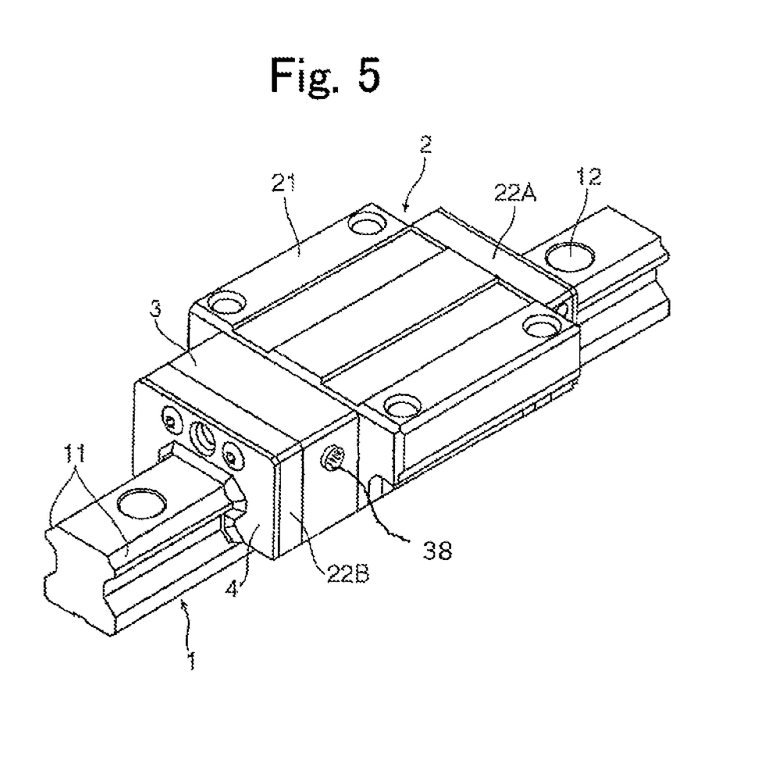
FIG. 5 is a perspective view for illustrating a rolling guide device in a second embodiment to which the present invention is applicable.

FIG. 5 is a perspective view for illustrating a rolling guide device in a second embodiment to which the present invention is applied.

In the rolling guide device in the second embodiment, a measurement plate 3 is interposed between the main body member 21 and the one cover 22B of the moving member 2, and the vibration sensor 35 and the proximity sensors 36 are provided in the measurement plate 3.

Figure 6:
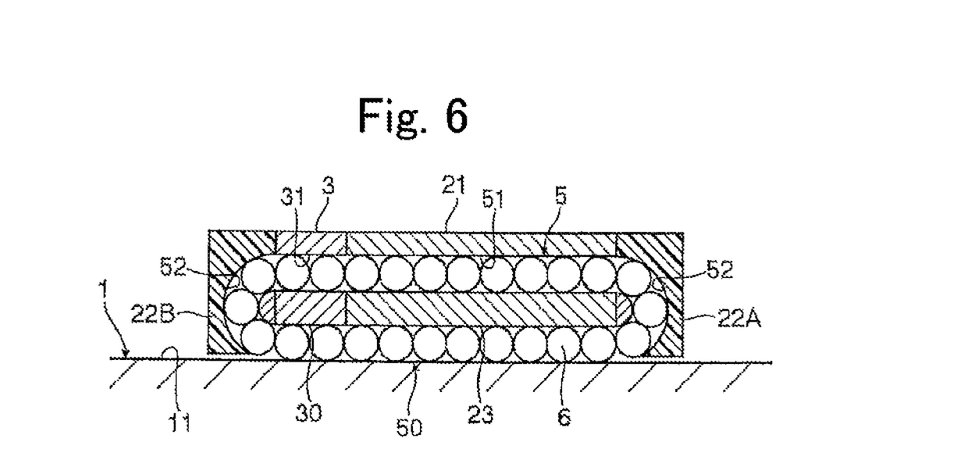
FIG. 6 is a sectional view for illustrating a configuration of an endless circulation path for balls of the rolling guide device in the second embodiment.

FIG. 6 is a sectional view for illustrating an endless circulation path for the rolling elements 6 in the second embodiment. The cover 22A is directly fixed to one end surface of the main body member 21, whereas the cover 22B is fixed to another end surface of the main body member 21 through intermediation of the measurement plate 3. The measurement plate 3 has a no-load communication path 30 and a communication return path 31. The no-load communication path 30 is continuous with the load path 50 of the main body member 21. The communication return path 31 is continuous with the return path 51 of the main body member 21. The rolling elements 6 roll in a no-load state without bearing the load in any of the no-load communication path 30 and the communication return path 31.

One cover 22A is directly fixed to an end surface of the main body member 21. Thus, the direction change path 52 of the cover 22A connects an end portion of the load path 50 and an end portion of the return path 51 to each other, and allows the rolling elements 6 to move therebetween. Another cover 22B is fixed to the main body member through intermediation of the measurement plate 3. Thus, the direction change path 52 of the cover 22B connects an end portion of the no-load communication path 30 and an end portion of the communication return path 31 of the measurement plate 3 to each other, and allows the rolling elements 6 to move therebetween.

Therefore, when the measurement plate 3 and the pair of covers 22A and 22B are fixed to the main body member 21, the endless circulation path 5 for the rolling elements 6, which includes the no-load communication path 30 and the communication return path 31 of the measurement plate 3, is brought to completion. In the endless circulation path 5, the rolling elements 6 roll while bearing the load only in the load path 50 defined by the load rolling surface 23 of the main body member 21 and the rolling surface 11 of the track member 1, which are opposed to each other.

Figure 7:
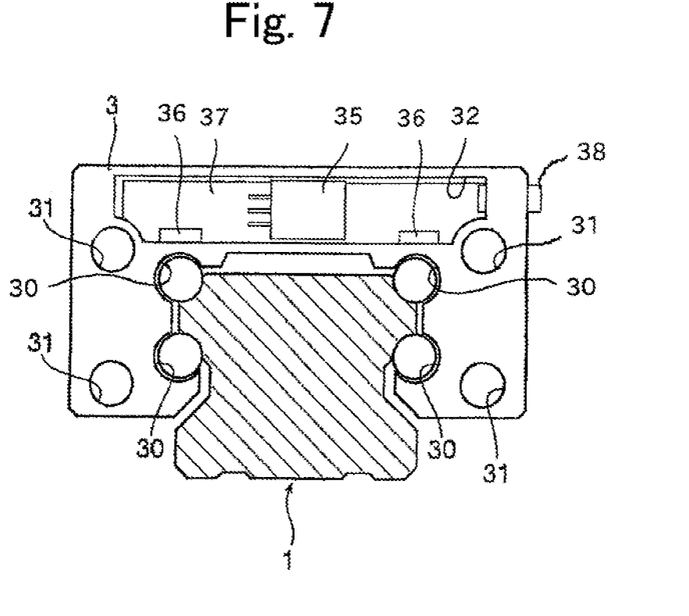
FIG. 7 is a sectional view for illustrating a schematic configuration of a measurement plate in the second embodiment.

FIG. 7 is an illustration of an example of the measurement plate 3, and is a front view for illustrating the measurement plate 3 as seen from a joint, surface side with respect to the main body member 21.

The measurement, plate 3 has a mounting portion 32 which is opened toward the main body member 21. The vibration sensor 35 and the plurality of proximity sensors 36 are accommodated in the mounting portion 32. The vibration sensor 35 and the proximity sensors 36 are mounted to an electronic board 37, and are accommodated in the mounting portion 32 together with the electronic board 37. A microcontroller serving as the control unit 39 including a RAM and a ROM is mounted to the electronic board 37. Detection signals from the vibration sensor 35 and the proximity sensors 36 are input to the control unit 39 through, for example, an A/D converter. Further, a connector 38 configured to output a signal to an outside of the measurement plate 3 and supply power to the electronic board 37 is connected to the electronic board 37, and the connector 38 is provided so as to penetrate through the measurement plate 3. The connecter 38 is connected to an alarm device or the user interface 40 such as a display, and a determination signal output by the control unit 39 is output to an external device.

An acceleration sensor can be used as the vibration sensor 35 similarly to the first embodiment. The vibration sensor 35 is held in abutment against the main body member 21 of the moving member 2 under a state in which the vibration sensor 35 is accommodated in the mounting portion 32 of the measurement plate 3. Specifically, the vibration sensor 35 is directly bonded to the end surface of the main body member 21 to which the measurement plate 3 is fixed. Further, as the proximity sensors 36, induction-type or capacitance-type proximity sensors similar to those in the first embodiment may be used. The proximity sensors 36 are fixed to the inner wall of the mounting portion 32 at positions adjacent to the no-load communication paths 30 of the measurement plate 3. In the example illustrated in FIG. 7, the proximity sensors 36 are provided so as to respectively correspond to two locations of the no-load communication paths 30 located in the vicinity of the mounting portion 32.

Other configurations are similar to those of the rolling guide device in the first embodiment illustrated in FIG. 1. The similar components are denoted by reference symbols which are the same as those in the first embodiment in the drawings, and detailed description thereof is omitted herein.

Figure 8:
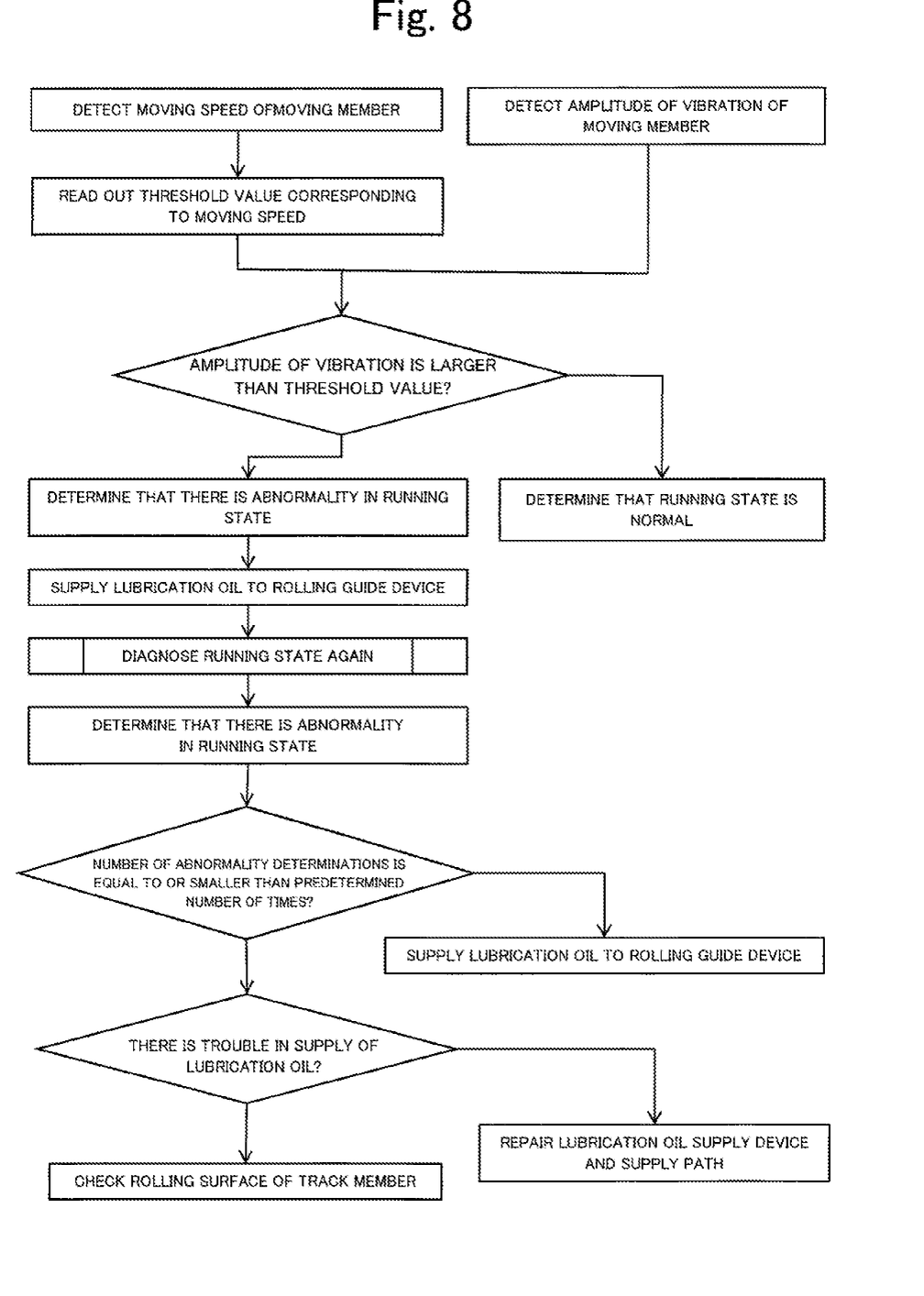
FIG. 8 is a flowchart for illustrating a state diagnosis method for a rolling guide device according to the present invention.

FIG. 8 is a flowchart for illustrating a state diagnosis method according to the present invention.

As described above, it is found that, in the rolling guide device, when the lubrication state of the track member 1 or the rolling elements 6 is deteriorated, of vibration caused in the main body member 21 during running of the moving member 2, an amplitude of vibration having a high-frequency component of several tens of KHz or more tends to be increased. Further, as the moving speed of the moving member 2 is increased, the threshold value for classifying the lubrication state into the normal or the abnormal tends to be higher.

Therefore, when whether or not the rolling guide device is in a good state is to be diagnosed, first, the moving speed of the moving member 2 is detected using the output signals from the proximity sensors 36. With this, using the graph in FIG. 4 referred to above, a threshold value being a determination criterion for diagnosing a running state of the rolling guide device can be read out. Meanwhile, in order to recognize an amplitude of vibration caused during running of the moving member 2, an output signal from the vibration sensor is read out to detect the amplitude of the vibration of the moving member 2. Then, the threshold value determined based on the moving speed of the moving member 2 and the detected amplitude of the vibration are compared to each other, and it is determined whether or not the amplitude of the vibration caused in the moving member 2 is larger than the threshold value.

When the detected amplitude of the vibration is smaller than the threshold value determined based on the moving speed, it is considered that the running state of the moving member 2 is normal, and the rolling guide device can be used continuously as it is. In contrast, when the detected amplitude of the vibration is larger than the threshold value determined based on the moving speed, there is an abnormality in the running state of the moving member 2, and, as a cause thereof, it is considered that there is a lubrication defect in the rolling surfaces 11 of the track member 1 or the rolling elements 6, or an abnormality occurs in the rolling surfaces 11 themselves.

When it is determined that there is an abnormality in the running state of the moving member 2, first, lubricant is supplied to the rolling guide device. This is because, as described above, the increase in amplitude of the vibration caused in the moving member 2 is closely related to whether the lubrication state of the track member 1 or the rolling elements 6 is good or bad. Therefore, when the lubricant is supplied to the rolling elements arranged in the rolling surfaces of the track member or the moving member, it is considered that the amplitude of the vibration of the moving member may be reduced.

In the rolling guide device to be used in various conveying devices or machine tools, in order to omit a trouble of manually supplying the lubricant, a supply pipe for the lubricant is connected from a lubricant pump to the moving member 2, and the lubricant pump is driven to supply the lubricant to the rolling guide device. Therefore, when it is determined that there is an abnormality in the running state of the moving member 2, the lubricant can be supplied by driving the lubricant pump.

After the lubricant is supplied, the moving speed of the moving member 2 is detected using the output signals from the proximity sensors 36 again, and the output signal from the vibration sensor is read out to detect the amplitude of the vibration of the moving member 2. Then, the threshold value determined based on the moving speed of the moving member 2 and the detected amplitude of the vibration are compared to each other, and the running state of the moving member 2 is re-diagnosed.

As a result of the re-diagnosis, when the detected amplitude of the vibration is smaller than the threshold value determined based on the moving speed, it can be specified that the cause of the abnormality in the running state in the first diagnosis resides in insufficient lubrication, and the rolling guide device can be used continuously as it is while preventing insufficient lubrication thereafter.

In contrast, as a result of the re-diagnosis, when the detected amplitude of the vibration is larger than the threshold value determined based on the moving speed, there is still an abnormality in the running state of the moving member 2, and the running state of the moving member 2 is not improved through the supply of the lubricant. For example, when, even after the diagnosis of the running state and the supply of the lubricant are repeated several times, it is diagnosed that there is an abnormality in the running state of the moving member 2, a trouble may occur in the lubricant pump or a pipe path for supplying the lubricant from the lubricant, pump to the moving member 2. Therefore, when instructions to re-diagnose the running state and to supply the lubricant are repeated within a certain period of time, it is checked whether or not a trouble occurs in supply of the lubricant itself, specifically, a failure of a lubricant supply device such as the lubricant pump, or clogging of the supply path for the lubricant.

When a trouble occurs in supply of the lubricant, a repair of the lubricant supply device and a repair of the pipe are carried out. In contrast, when a trouble does not occur in supply of the lubricant, a cause of a fact that the amplitude of the vibration of the moving member 2 exceeds the threshold value does not reside in insufficient lubrication, but other causes are conceivable. In this case, a case in which a trouble occurs in the rolling surfaces 11 of the track member 1 is highly conceivable. For example, occurrence of so-called flaking in which the rolling surfaces 11 are exfoliated into scales is conceivable. Therefore, when a trouble does not occur in supply of the lubricant, it is required to check the state of the rolling surfaces 11 of the track member 1.

Figure 9:
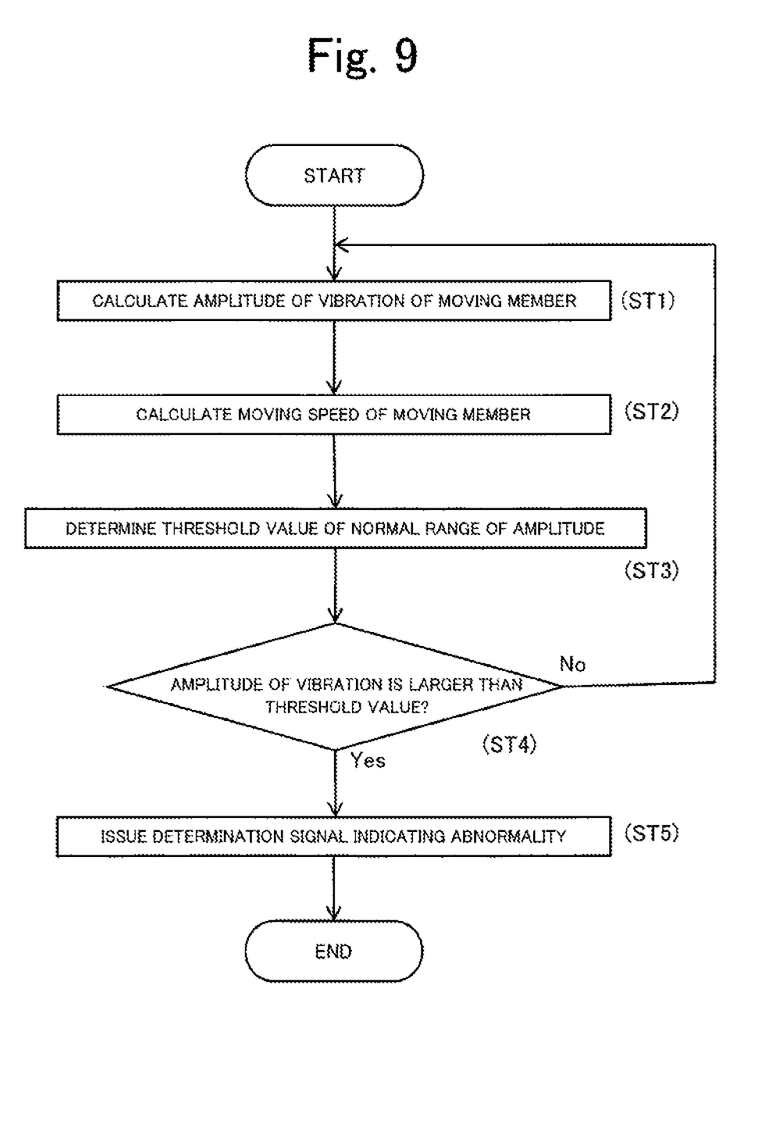
FIG. 9 is a flowchart for illustrating an operation of a control unit.

FIG. 9 is a flowchart for illustrating the details of a diagnosis program for executing the diagnosis method in the control unit 39 (see FIG. 3). The diagnosis program is executed while the moving member 2 is running relative to the track member 1. First, the control unit 39 calculates an average value of the amplitude of the vibration of the moving member 2 per unit time based on the output signal from the vibration sensor 35 (ST1). Next, the control unit 39 calculates the moving speed of the moving member 2 relative to the track member 1 based on the signal from the proximity sensor 36 (ST2). Then, with reference to a table stored in advance in the control unit 39, a threshold value of an amplitude corresponding to the calculated moving speed is read out (ST3). After that, the control unit 39 compares the average value of the vibration amplitude of the moving member 2 and the threshold value read out from the table to each other (ST4). As a result of the comparison, when the calculated amplitude of the vibration is smaller than the threshold value, there is no abnormality in the running of the moving member 2 relative to the track member 1, and it is determined that the lubrication of the rolling surfaces 11 of the track member 1 and the rolling elements 6 is properly carried out. Thus, the above-mentioned steps ST1 to ST4 are repeated while the running of the moving member 2 is continued.

In contrast, when the calculated amplitude of the vibration is larger than the threshold value in the above-mentioned step T4, it is determined that there is an abnormality in the running of the moving member 2, for example, a lubrication defect occurs in the rolling surfaces 11 of the track member 1 and the rolling elements 6, and a determination signal indicating the abnormality (hereinafter referred to as "alarm signal") is issued (ST5). Based on the alarm signal, the user interface 40 connected through the connecter 38 informs a user of a running abnormality of the rolling guide device.

The user notified of the running abnormality from the user interface 40 can address matters considered to be a cause of the running abnormality of the moving member 2, for example, can supply the lubricant to the rolling surfaces 11 of the track member 1 or the rolling elements 6. Further, the lubricant pump may be activated automatically with the issue of the alarm signal as a trigger to forcibly supply the lubricant to the endless circulation path 5 for the rolling elements 6 of the moving member 2.

Further, a counter configured to count the number of occurrences of the alarm signal may be additionally provided so that, when the alarm signal is generated a predetermined number of times within a certain period of time, a different way of addressing can be presented to the user through the user interface 40. For example, in a case in which, even after the lubricant is forcibly supplied to the rolling surfaces 11 of the track member 1 or the rolling elements 6 after a first issue of the alarm signal, the alarm signal is issued again within a certain period of time, a failure of the lubricant pump or clogging of the pipe path for the lubricant from the lubricant pump to the moving member 2 is presumed. Further, it is also presumed that a flaking phenomenon may occur in the rolling surfaces 11 of the track member 1 or the load rolling surface 23 of the moving member 2. Therefore, the display content of the user interface 40 is changed in accordance with the number of occurrences of the alarm signal within a certain period of time, thereby enabling the user to appropriately address the running abnormality of the moving member 2.

Further, the rolling guide device of this type is used, for example, as a part configured to move a work table or move a headstock in a numerical-control machine tool such as a machining center. If there is an abnormality in the running of the moving member relative to the track member, it is conceivable that the accuracy in processing of a workpiece by the numerical-control machine tool may be affected. Therefore, it is effective that the determination signal issued from the state diagnosis system is directly input to a control computer of the numerical-control machine tool to reduce a rate of occurrence of products with defective machining.

Specifically, after receiving the issue of the determination signal (alarm signal) indicating the running abnormality, the control computer activates the lubricant pump connected to the rolling guide device. Thus, supply of the lubricant to the endless circulation path 5 for the rolling elements 6 of the moving member 2 can be immediately started. With this, an operation of the machine tool is not continued under a state in which the supply of the lubricant to the rolling guide device is deficient. Thus, extreme shortening of a product lifetime of the rolling guide device can be avoided, and, in addition, an operation stoppage time of the machine tool for maintenance can be shortened so that an operating rate of the machine tool can be enhanced. Further, when the alarm signal is repeatedly issued within a certain period of time, the operation of the machine tool can be forcibly stopped to prompt the user to perform inspection.

In the diagnosis method for the running state of the rolling guide device as described above, the moving speed of the moving member 2 and the amplitude of the vibration of the moving member 2 are detected. Thus, the lubrication state of the track member or the rolling elements in the rolling guide device can be monitored and diagnosed in a real-time manner, thereby being capable of maintaining the best state of operations of various industrial machines using the rolling guide device.

In the description of the state diagnosis system with reference to the flowchart in FIG. 9, the determination signal (alarm signal) from the control unit 39 indicating the running abnormality of the rolling guide device is output to the user interface 40 or other devices. However, the determination signal indicating that, the running is normal may be output.

Further, the rolling guide device in the embodiments described with reference to the drawings is of a type in which the track member is laid on the fixed portion. However, the present invention is also applicable to a rolling guide device such as a ball-spline device or a ball screw device of a type in which the track member is formed into a rod shaft shape such that only both ends thereof are supported by the fixed portion.

The invention claimed is:

1. A state diagnosis method for a rolling guide device, the rolling guide device including:
    a track member having a rolling surface extending along a longitudinal direction of the track member; and
    a moving member, which is assembled to the track member through intermediation of a plurality of rolling elements configured to roll on the rolling surface so that the moving member is movable along the track member, and has an endless circulation path for the rolling elements,
the state diagnosis method comprising:
    detecting a moving speed of the moving member relative to the track member while detecting relative vibration displacement of the moving member relative to the track member using a vibration sensor mounted to the moving member;
    diagnosing a running state of the moving member relative to the track member based on those detection results;
    comparing, after a threshold value of the vibration displacement of the moving member is determined based on the moving speed of the moving member, a detection signal from the vibration sensor and the threshold value;

determining, when the detection signal from the vibration sensor is larger than the threshold value, that there is an abnormality in the running state of the moving member relative to the track member;

supplying, when an abnormality in the running state of the moving member relative to the track member is determined, lubricant to the rolling guide device;

reading out the detection signal from the vibration sensor to determine the threshold value again after the supply of the lubricant is completed; and determining, when the detection signal from the vibration sensor is larger than the threshold value after the supply of the lubricant is completed, that there is a defect in the supply of the lubricant or a defect in the rolling surface of the track member.

2. The state diagnosis method for a rolling guide device according to claim 1, wherein the threshold value has a proportional relationship with the moving speed of the moving member relative to the track member.

3. The state diagnosis method for a rolling guide device according to claim 1, further comprising:

counting the rolling elements moving in the endless circulation path by using a proximity sensor mounted to the moving member; and detecting the moving speed of the moving member relative to the track member based on the counting result.

4. A state diagnosis system for a rolling guide device, the rolling guide device including:

a track member having a rolling surface extending along a longitudinal direction of the track member; and a moving member, which is assembled to the track member through intermediation of a plurality of rolling elements configured to roll on the rolling surface so that the moving member is movable along the track member, and has an endless circulation path for the rolling elements, the state diagnosis system comprising:

a vibration sensor, which is mounted to the moving member, and is configured to detect relative vibration displacement of the moving member relative to the track member;

means for detecting a moving speed of the moving member relative to the track member; and a control unit configured to generate a determination signal indicating a normality or an abnormality of a running state of the moving member relative to the track member based on the detected vibration displacement and moving speed of the moving member, wherein, when the determination signal indicates an abnormality of the running state of the moving member, the control unit sends a signal instructing supply of lubricant to a lubricant supply device provided in the rolling guide device, and wherein, when, after the control unit sends the signal instructing supply of the lubricant to the lubricant supply device, a determination signal indicating an abnormality of the running state of the moving member is repeatedly generated a predetermined number of times within a predetermined period of time, the control unit issues an alarm signal prompting inspection of the track member and the moving member.

5. The state diagnosis system for a rolling guide device according to claim 4, wherein the control unit is configured to determine a threshold value being a determination criterion for determining whether the running state of the moving member is good or bad based on the moving speed of the moving member.

6. The state diagnosis system for a rolling guide device according to claim 4, wherein the threshold value has a proportional relationship with the moving speed of the moving member.

7. The state diagnosis system for a rolling guide device according to claim 4, wherein the means for detecting the moving speed of the moving member is a proximity sensor mounted to the moving member, and is configured to detect the rolling elements moving in the endless circulation path, and wherein the control unit is configured to detect the moving speed of the moving member relative to the track member based on a detection signal from the proximity sensor.

* * * * *